April 22, 1958

J. L. MAY 2,831,451

TOOL FOR KNOCKING ADHERING BARNACLES AND OTHER
ANOMALOUS GROWTHS FROM THE HULLS
OF BOATS AND THE LIKE

Filed Oct. 26, 1956

INVENTOR
James L. May

BY *Lancaster, Allwine & Rommel*

ATTORNEYS

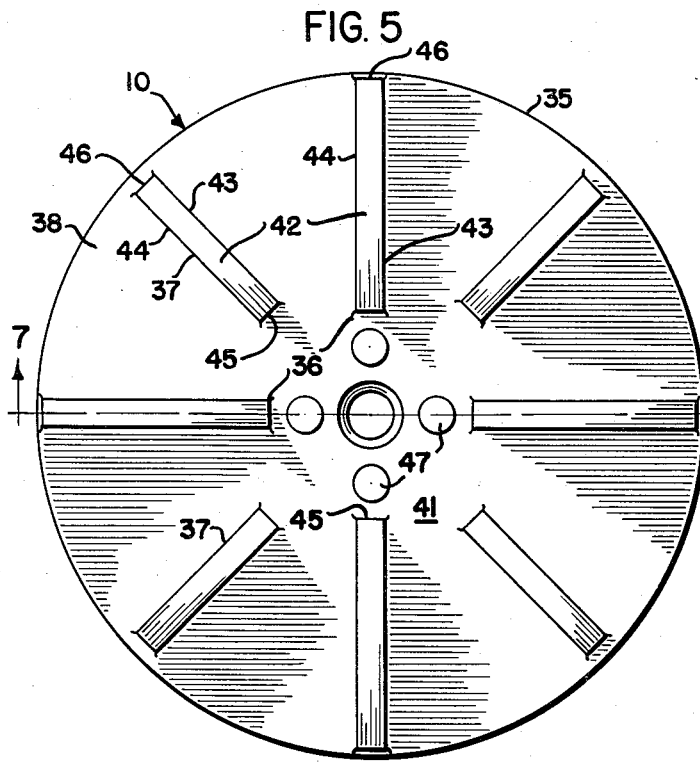
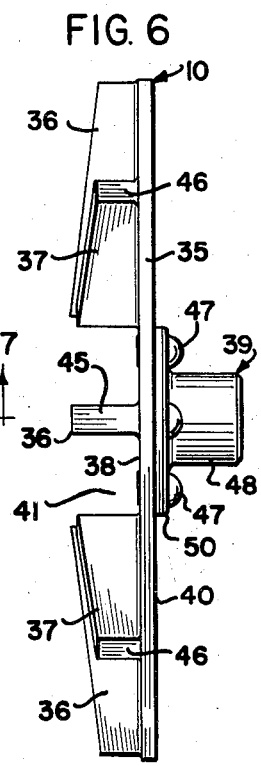
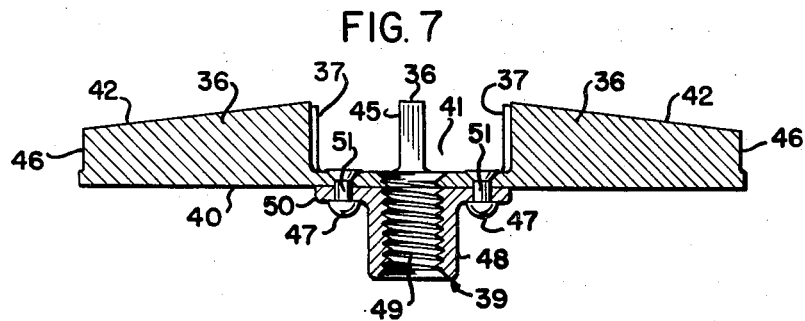

United States Patent Office 2,831,451
Patented Apr. 22, 1958

2,831,451

TOOL FOR KNOCKING ADHERING BARNACLES AND OTHER ANOMALOUS GROWTHS FROM THE HULLS OF BOATS AND THE LIKE

James L. May, Tallahassee, Fla., assignor of fifty percent to George Lawrence Salley, Tallahassee, Fla.

Application October 26, 1956, Serial No. 618,612

5 Claims. (Cl. 114—222)

This invention relates to tools for knocking adhering barnacles and other anomalous growths from the hulls of boats and the like.

The principal objects of the invention are to provide a rotary tool comprising a disc body with means for mounting the center thereof for powered rotary movement about an axis, and hammer-like ribs rigid with the body at one face thereof, arranged so that in operation the ribs will act like hammers to knock the barnacles and other unwanted material from adhering relationship to the hulls of boats and the like; to so locate the hammer-like ribs that they are not likely to provide zones where the unwanted material may become wedged or compacted in a manner to impair efficient operation of the tool; and to provide a tool which may be rotated in either direction —clockwise or counterclockwise—and still efficiently serve as a knocking medium for freeing the hulls of boats and the like of the thick, hard and irregular shaped accumulation of unwanted marine material such as barnacles, oysters, etc.

Another object is to provide tools of this character which may be used over a long period of time without the necessity of treatment such as the sharpening required when scrapers or pneumatic chipping hammers are used.

Other objects and advantages will appear in the following detailed description of two embodiments of my invention, taken in connection with the accompanying drawings forming a part of this specification, and in which drawings:

Figs. 5 and 6 are views similar to Figs. 2 and 3, respectively, but showing a modified form of tool.

Fig. 7 is a sectional view on the line 7—7 of Fig. 5.

Figure 1:
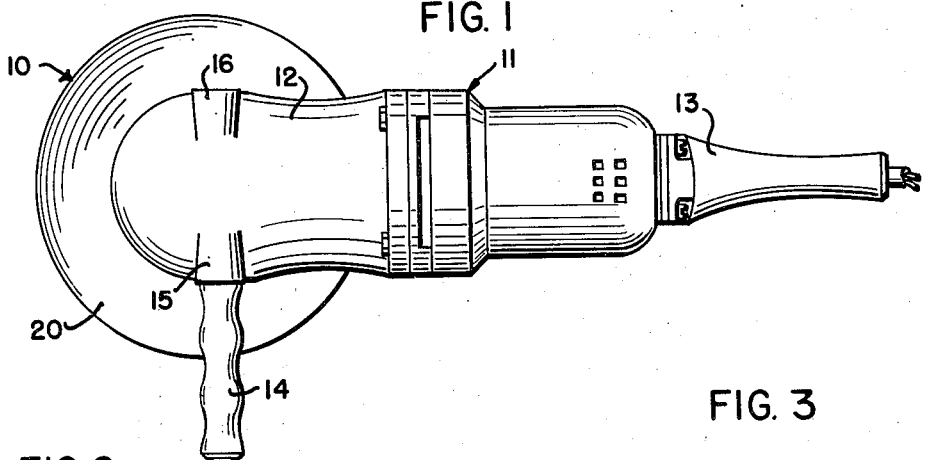
Fig. 1 is a plan view of a motorized barnacle knocker, made according to the present invention and looking toward the face of the tool opposite that face which usually confronts the work.

In the example shown in Fig. 1 a tool or barnacle knocker 10, which may be of the type shown in either Figs. 2–4 or 5–7 is mounted for rotation by a portable motor 11, here shown as of the electric type including an elongated body portion 12 with major axially extending handle 13 and a minor laterally extending handle 14. The motor may be of any suitable type either made to rotate the tool 10 in a uniform direction, such as clockwise when viewed as in Fig. 1, or one which may be reversed at the will of the operator and under which condition it is desirable to have the handle 14 detachably connected to a boss 15 on the body portion, there being an opposite boss 16 with which the handle may be connected, all of which is common in the art of pivotable power tools. Thus a right-handed person may grasp the major handle 13 for supporting the motor and tool while working, and grasp the handle 14 to steady and guide the motor and tool with respect to the work. A left-handed person may change the position of handle 14 and grasp it with the right hand for guiding purposes, grasp the handle 13 for support of the tool and reverse the direction of rotation of the tool 10. This is merely by way of example for the tool 10 is self cleaning, so to speak, in that the workman can generally apply the tool to the work in a manner that the material knocked off the hull flies by centrifugal force generally away from his body. In practice the optimum speed of the tool 10 is around 800 to 1000 R. P. M.

Figure 2:
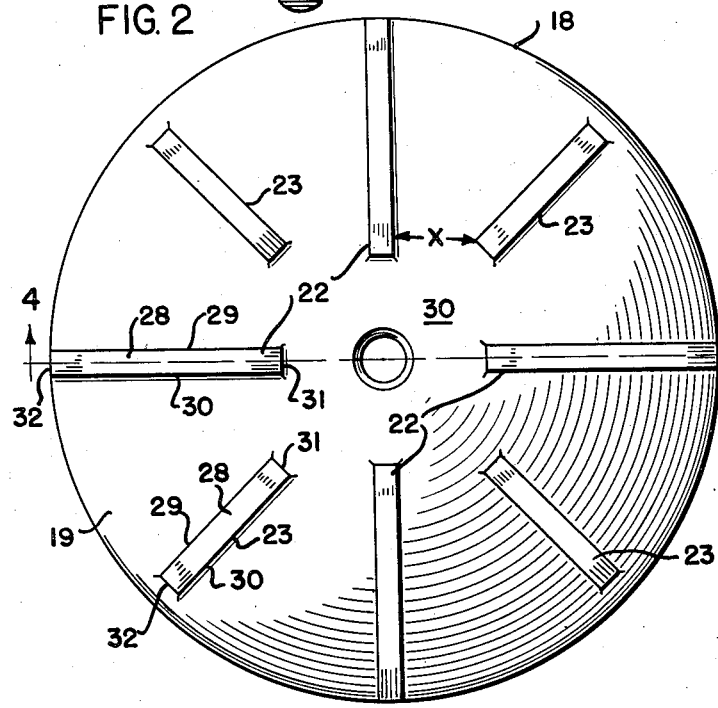
Fig. 2 is a plan view, on an enlarged scale of the tool per se looking toward the face that usually confront the work.
Figure 3:
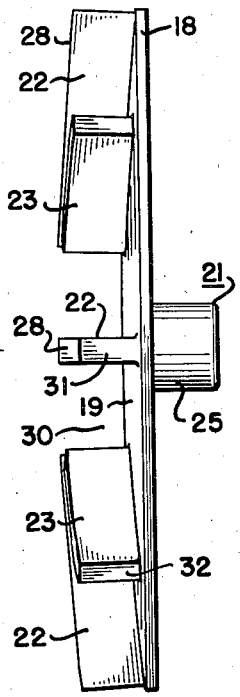
Fig. 3 is a side elevation of the tool.
Figure 4:
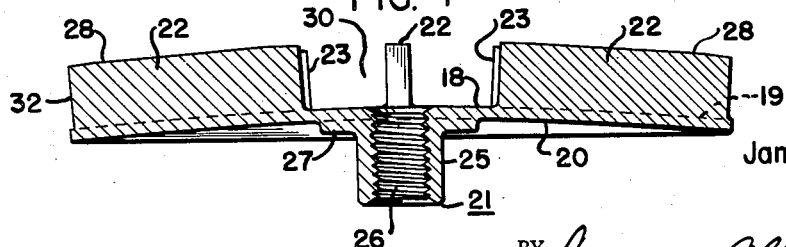
Fig. 4 is a sectional view on the line 4—4 of Fig. 2.

Referring first to the form of tool shown in Figs. 2–4, it may be cast in one piece of strong, rigid or inflexible metal, such as steel, and comprises a dished disc body 18 presenting a convex work confronting face 19 and a concave rear face 20; means 21 for mounting the center of the body for powered rotary motion about the axis of the body 18, and a plurality of major hammer-like ribs 22 and a plurality of minor hammer-like ribs 23 rigid with the body 18 and extending from the face 19 thereof.

The means 21 may be in the nature of a sleeve 25 provided with an internal screw thread 26 for engagement with a threaded shaft (not shown in the drawing) of the motor 11, and a reinforcing ring-like enlargement 27 integral with the body 18 and sleeve 25.

The ribs 22 and 23 are radially disposed with respect to the axis of rotation of the body 18 and spaced a considerable distance from said axis so as to provide a circular zone 30 about the axis, devoid of any ribs or projections. The ribs are also each preferably of substantially rectangular and uniform cross-section throughout at least the major portion of its length. Thus each rib presents an elongated outermost work engaging face 28, parallel lateral hammer faces 29 and 30, and end faces 31 and 32. Also the faces 28 preferably are substantially parallel the convex face 19 of the body 18, and the lateral faces 29 and 30 are in planes normal to the face 19.

The major hammer-like ribs 22 are relatively long as compared with the length of the minor hammer-like ribs 23 and the ribs 22 alternate in position with respect to the ribs 23, as clearly shown in Fig. 2.

Without any limitation with respect to dimensions, in a typical example of a tool found very practical for small boats, the body 10 has a seven inch diameter, the major ribs 22 each a two and one-half inch length, the minor ribs 23 a one and three-quarter inch length, both types of ribs a width of one-quarter inch and a depth of five-eighths of an inch.

Among important characteristics of the invention is to dispose the major ribs 22 alternating in position with respect to the minor ribs 23 and with the ends 31 of the former spaced closer to the axis of rotation of the body 18, than the ends 31 of the minor ribs as clearly shown in Fig. 2. Referring again to the typical dimensions of a practical embodiment of this invention, the ends 31 of ribs 22 are each spaced about one inch from the axis of body 18, while the ends 31 of ribs 23 are each spaced approximately one and one-half inches from said axis. As a result the zone 19 has a diameter of approximately two inches and if the tool is provided with four of each ribs 22 and 23, the distance X in Fig. 2, which is the closest spacing of adjacent major and minor ribs, will be approximately one inch. The advantages of these characteristics will be set forth hereinafter.

The ribs 22 may be disposed with their ends 32 flush with the circumferential periphery of the body 18, and the ribs 23 disposed with their ends 32 spaced inward a slight distance from said periphery as shown in Fig. 2, which has been found to have some advantage in keeping the tool from hopping or jumping about, when in use, due to the blows of the longer hammer-like ribs 22 being heavier than the blows of the shorter hammer-like ribs 23.

Referring now to the form of tool shown in Figs. 5–7, a flat disc body 35 is provided with major hammer-like ribs 36 and minor hammer-like ribs 37 rigid with and extending from one face 38 of the body, in substantially the same manner and of different lengths as set out in connection with the ribs 22 and 23, respectively, and means 39 is provided at the other face 40 of the body for mounting the center of the body for powered rotary motion about its axis. In this form of the invention the ribs are preferably of uniform width, but each of progressively less height in a direction from a circular zone 41 about the axis of the body 35, devoid of any ribs or projections. Thus each of the ribs 36 and 37 has an outermost work engaging face 42, parallel lateral hammer faces 43 and 44 and end faces 45 and 46, but in this form, the outermost working faces are in planes which converge with respect to the plane of the body 35 in an outward direction with respect to the axis of rotation of the latter.

The means 39 in this form is shown as a separate element attached to the body 35 in any suitable manner, such as by rivets 47, and comprises a sleeve 48, provided with an internal screw thread 49, and a flange 50 at one end of the sleeve. The rivets 47 each has a shank 51 extending through aligned openings in the body and flange 50.

When using the tool, the workman may find it necessary when encountering a thick bed of accumulated barnacles, to first present the tool "flat to the crust of the bed," so to speak, until the hard base is reached. This can be quickly accomplished although the hammer-like ribs then knock the hollow cone-like tips of the barnacles in all directions circumferentially of the tool. If this approach is continued when the hard base is reached, the tendency of the tool is to "walk" as it is expressed by workmen. It is, when this hard base is reached, or when the bed of accumulated barnacles is not thick, that the workman tilts the tool so that, in effect, only a segmental zone of the tool is presented to the work and the scattering of the loosened material in all directions laterally is avoided.

By the provision of alternately long and short hammer-liks ribs such tends to keep the tool from hopping or jumping, so to speak, when in use, since the effect is like imparting heavy and lighter blows in succession to the work. I have also discovered that this arrangement of ribs avoids the wedging of material between the ribs at the zones where there is minimum space between them. While barnacles range in size, in most localities, so as to be anywhere from ¼" to possibly a maximum of ¾" in diameter at the base and grow to provide cone-like hollow tips which are usually initially knocked off by the hammer-like blows of the ribs, occasionally the entire barnacle will be knocked off and by the provision of the alternately long and short hammer-like ribs this spacing of the ribs in the zone near the center of the disc can be made greater than the maximum diameter of the barnacles usually encountered in contradistinction to having the ribs all of the same length. By making the ribs of substantially uniform rectangular cross-section, shown in Figs. 2–4, as they wear down through use, the space between the work engaging faces of the ribs remains the same throughout the life of the tool.

In practice it has been found that a workman using the tool can completely remove barnacles and other anomalous growths from the hull of a boat in about one-tenth the time it takes by practicing methods in common use, such as by hand scraping. The tool is also a time and labor saving device in comparison with those methods used in cleaning the hulls of large ships, such as by use of power hose and pneumatic chipping hammers.

I am well aware that it has been proposed in the past to provide rotary tools for scraping, surfacing and polishing surfaces, the discs being provided with sharp blades, block-like projections, or lugs, but such have not been found satisfactory for the purpose of knocking barnacles and the like from boats for several reasons. Among these may be mentioned the rapid wear of the blades or other projections after a short period of use; the tendency of the material removed from the surfaces, if in the nature of barnacles, to gather in compact mass at the axis of rotation of the tool and form a hub-like projection which decreases the efficiency of the tool and even makes its use impossible, unless this hub-like mass is removed; and the inability to rotate the tool either clockwise or counterclockwise according to whether the workman is more dexterous in using the right hand or the left hand in holding and guiding the tool with respect to the work and still assuring that the loosened material will be ejected or dispersed from the tool by centrifugal force, mainly in a direction away from the body of the operator.

I am also aware that it has been proposed to provide apparatus for cleaning ships' bottoms as in the patent to McCutchan 487,198 of November 29, 1892, intended to be let down in the water while the ship is afloat. In this McCutchan apparatus rotary units are used each provided with propeller blades intended to engage the barnacles, etc., but such blades are necessarily curved if they function at all to carry the apparatus toward and keep it in engagement with the work and hence the units must have a definite direction of rotation to carry out the principle of the invention. Also the blades extend from a hub which tends to retard penetration of the blades into the accumulation of barnacles, etc., and to trap the loosened material between the blades, building up, in effect, an enlarged false hub-like mass.

While I have herein given certain dimensions of tools which have been made, tested and found to operate efficiently, it is to be understood that such dimensions are merely by way of example. Due to the different characteristics of barnacles encountered in various localities and the possibility of providing much larger tools for freeing the accumulations on large ships and where apparatus may be provided for relieving the workman from carrying the load of the tool and motor, but still guiding it for efficient and expeditious work, I am not limited as to sizes of parts, which may be varied still carrying out the principle of the invention as defined in the following claims.

I claim:

1. A rotary tool for use in knocking barnacles, oysters and other marine accumulations and growths from the hulls of boats and the like, comprising a disc body, means for securing said body to a source of power for powered rotary motion in either direction, about an axis, and a plurality of hammer-like major and minor ribs rigid with said body at one face thereof, radially disposed with respect to the axis of rotation of said body and spaced from said axis to provide a circular zone, about said axis devoid of said ribs, said ribs being of substantially uniform width, the major ribs being relatively long as compared with said minor ribs and said major ribs alternating in position with respect to said minor ribs and spaced closer to said axis than said minor ribs.

2. A rotary tool as specified in claim 1 in which said ribs are each substantially of rectangular and uniform cross-section throughout at least the major portion of its length.

3. A rotary tool as specified in claim 2 in which said disc-like tool body is dished in shape and said ribs are at the convex face thereof whereby the outermost work engaging faces of the ribs are substantially parallel to said convex face.

4. A rotary tool for use in knocking barnacles, oysters and other marine accumulations and growths from the hulls of boats and the like, comprising a disc body, means for securing said body to a source of power for powered rotary motion in either direction, about an axis, and a plurality of hammer-like major and minor ribs rigid with said body at one face thereof, radially disposed with respect to the axis of rotation of said body and spaced from said axis to provide a circular zone, about said axis devoid of said ribs, the major ribs being relatively long as compared with said minor ribs and said major ribs alternating in position with respect to said minor ribs and spaced closer to said axis than said minor ribs.

5. A rotary tool as specified in claim 1 in which said disc body is flat and said major and minor ribs are each progressively of less height in a direction from said zone toward the edge of the disc body.

References Cited in the file of this patent
UNITED STATES PATENTS

| | | |
|---|---|---|
| 487,198 | McCutchan | Nov. 29, 1892 |
| 2,036,656 | Stowell et al. | Apr. 7, 1936 |
| 2,148,479 | Kraus | Feb. 28, 1939 |
| 2,178,169 | Goertzen | Oct. 31, 1939 |
| 2,497,941 | Hobson | Feb. 21, 1950 |